United States Patent
Suzuki

(10) Patent No.: US 11,268,171 B2
(45) Date of Patent: Mar. 8, 2022

(54) ALUMINUM ALLOY FOIL, AND METHOD FOR PRODUCING ALUMINUM ALLOY FOIL

(71) Applicant: MITSUBISHI ALUMINUM CO., LTD., Tokyo (JP)

(72) Inventor: Takashi Suzuki, Susono (JP)

(73) Assignee: MITSUBISHI ALUMINUM CO., LTD., Tokyo (JP)

(*) Notice: Subject to any disclaimer, the term of this patent is extended or adjusted under 35 U.S.C. 154(b) by 124 days.

(21) Appl. No.: 16/628,675

(22) PCT Filed: Sep. 6, 2017

(86) PCT No.: PCT/JP2017/032070
§ 371 (c)(1),
(2) Date: Jan. 5, 2020

(87) PCT Pub. No.: WO2019/008784
PCT Pub. Date: Jan. 10, 2019

(65) Prior Publication Data
US 2020/0216933 A1 Jul. 9, 2020

(30) Foreign Application Priority Data
Jul. 6, 2017 (JP) .............................. JP2017-133113

(51) Int. Cl.
*C22C 21/00* (2006.01)
*C21D 8/02* (2006.01)

(52) U.S. Cl.
CPC ............ *C22C 21/00* (2013.01); *C21D 8/0226* (2013.01); *C21D 8/0236* (2013.01)

(58) Field of Classification Search
None
See application file for complete search history.

(56) References Cited

U.S. PATENT DOCUMENTS 6,531,006 B2 * 3/2003 Jin .......................... C22C 21/00
148/551
8,206,519 B2 * 6/2012 Howells ............... B22D 11/003
148/551

(Continued)

FOREIGN PATENT DOCUMENTS

| CN | 103003457 A | 3/2013 |
| CN | 103140592 A | 6/2013 |

(Continued)

OTHER PUBLICATIONS

Chinese Office Action (and English language translation thereof) dated Jan. 27, 2021 issued in Chinese Application No. 201780092566.3.

(Continued)

*Primary Examiner* — Daniel J. Schleis
(74) *Attorney, Agent, or Firm* — Holtz, Holtz & Volek PC

(57) ABSTRACT

An aluminum alloy foil has a composition containing 1.0% to 1.8% by mass of Fe, 0.10% to 0.20% by mass of Si, 0.005% to 0.05% by mass of Cu, and Mn regulated to be 0.01% by mass or less, with the balance consisting of Al and incidental impurities. With regard to crystal grains surrounded by high inclination angle grain boundaries which are grain boundaries having a misorientation of 15° or more in analysis of crystal orientation per unit area using electron backscatter diffraction, an average grain size of the crystal grains is 10 μm or less, and a maximum grain size of the crystal grains/the average grain size of the crystal grains ≤3.0. When a thickness of the foil is 30 μm, elongations in directions making 0°, 45° and 90° with respect to a rolling direction are each 25% or more respectively.

4 Claims, 1 Drawing Sheet

(56) References Cited

U.S. PATENT DOCUMENTS

| | | | |
|---|---|---|---|
| 9,732,402 B2* | 8/2017 | Seki | C22C 21/00 |
| 2015/0203941 A1 | 7/2015 | Seki et al. | |

FOREIGN PATENT DOCUMENTS

| | | |
|---|---|---|
| CN | 103682365 A | 3/2014 |
| CN | 104364401 A | 2/2015 |
| CN | 104508162 A | 4/2015 |
| CN | 104641011 A | 5/2015 |
| JP | 2004027353 A | 1/2004 |
| JP | 2009173973 A | 8/2009 |
| JP | 2011179062 A | 9/2011 |
| JP | 2016156059 A | 9/2016 |
| JP | 2017031448 A | 2/2017 |
| JP | 2017110244 A | 6/2017 |
| JP | 2017115224 A | 6/2017 |
| WO | 2013168606 A1 | 11/2013 |
| WO | 2014021170 A1 | 2/2014 |
| WO | 2014034240 A1 | 3/2014 |

OTHER PUBLICATIONS

Chinese Office Action (and English language translation thereof) dated Jan. 28, 2021 issued in Chinese Application No. 201780092567.8.

International Search Report (ISR) dated Dec. 5, 2017 (and English translation thereof), issued in International Application No. PCT/JP2017/032070.

Written Opinion of the International Searching Authority dated Dec. 5, 2017 issued in International Application No. PCT/JP2017/032070.

Related U.S. Appl. No. 16/628,674; Title: "Aluminum Alloy Foil, and Method for Producing Aluminum Alloy Foil;" filed Jan. 5, 2020; First Named Inventor: Takashi Suzuki.

English translation of the Written Opinion of the International Searching Authority dated Jan. 16, 2020 issued in International Application No. PCT/JP2017/032070.

* cited by examiner

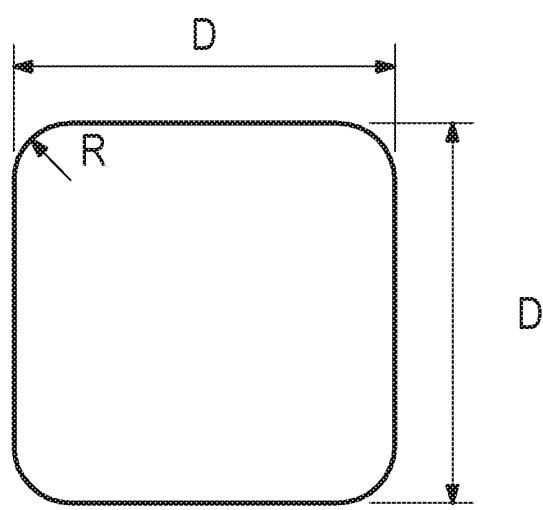

ALUMINUM ALLOY FOIL, AND METHOD FOR PRODUCING ALUMINUM ALLOY FOIL

TECHNICAL FIELD

The present invention relates to an aluminum alloy foil having excellent formability, and a method for producing an aluminum alloy foil.

BACKGROUND ART

Aluminum alloy foils used in packaging materials for food, lithium ion batteries and the like are required to have high elongation because such aluminum alloy foils are formed by applied with large deformation by press forming or the like. By way of example, flexible foils made of alloys of JIS A 1000 type such as those referred to as 1N30, or flexible foils made of alloys of JIS A 8000 type such as those referred to as 8079 or 8021 is conventionally used as materials having high elongation.

In most cases, an aluminum alloy foil is subjected to deformation in a plurality of directions due to so-called bulging, instead of being subjected to deformation in one direction. As a result, with regard to elongation properties of such an aluminum alloy foil, elongation in a rolling direction typically used as an elongation value, and in addition, elongations in directions making 45° and 90° with respect to a rolling direction are required to be high. Recently, foils as packaging materials are becoming thinner, for example, in the field of packaging materials for batteries. Therefore, there is a need for an aluminum alloy foil having high elongation, even when the thickness of the aluminum alloy foil is small.

For the purpose of achieving an aluminum alloy foil having high elongation, it has been proposed to control crystal grains within the alloy.

By way of example, in Patent Literature 1, as a result of the fact that the number density of an intermetallic compound having an average grain size of 20 μm or less and an equivalent circle diameter of 1.0 to 5.0 μm is set to greater than or equal to a predetermined value, the intermetallic compound serves as an nucleation site in recrystallization to achieve smaller grain size after the final annealing.

In Patent Literature 2, an aluminum alloy foil is proposed, in which a boundary having a misorientation of 50 or more in analysis of crystal orientation using electron backscattering diffraction pattern (EBSP) is defined as a grain boundary, and with regard to crystal grains contained within the grain boundary, an average value D of the crystal grains is set to 12 μm or less, and the area fraction of the crystal grains having a grain size of more than 20 μm is set to 30% or less.

In Patent Literature 3, the average grain size and the average grain size of subgrains are defined to be less than or equal to a predetermined value, and in addition, the dispersion density of an Al—Fe compound is defined to be greater than or equal to a predetermined value.

In Patent Literature 4, the formability is improved by defining the texture (orientation density).

CITATION LIST

Patent Literature

[Patent Literature 1] International Publication No. 2014/021170
[Patent Literature 2] International Publication No. 2014/034240
[Patent Literature 3] Japanese Patent Laid-Open No. 2004-27353
[Patent Literature 4] International Publication No. 2013/168606

SUMMARY OF INVENTION

Technical Problem

However, the invention described in Patent Literature 1 involves concerns that the additive amount of Cu is 0.5 mass % by the maximum amount and considered to be large. Cu is an element that decreases rolling ability even in a trace amount, and therefore, brings a risk that edge cracks generate to cause fracture of the foil during rolling. Furthermore, the average grain size is also large, and as a result of this, when the thickness of the foil becomes smaller, maintenance of high formability is likely to be difficult.

In Patent Literature 2, a very fine grain size is defined; however, the grain boundary is defined to have a misorientation of 50 or more. The misorientation of 50 or more results in a situation where the high inclination angle grain boundary and the low inclination angle grain boundary are present in a mixed manner, and the crystal grains surrounded by the high inclination angle grain boundary are not ensured to be fine.

Unlike Patent Literatures 1 and 2 that relate to a foil as a packaging material for batteries, Patent Literature 3 relates to a thin foil having a thickness of 10 μm or less, and this thin foil is produced without intermediate annealing to result in growth of a structure, and it is not possible to achieve elongation stabilized in directions making 0°, 45° and 90° with respect to a rolling direction. In addition, the average grain size is also 10 μm or more, and when the thickness of the foil is thin, it cannot be expected for high formability to be achieved.

In Patent Literature 4, the elongation properties are insufficient, and in addition, the balance between strength and elongation is also insufficient.

The present invention has been accomplished in view of the above problems, and it is one of objects of the present invention to provide an aluminum alloy foil having good processability and high elongation properties.

Solution to Problem

In other words, an aluminum alloy foil according to a first aspect of the present invention is characterized in that, has a composition containing 1.0% by mass or more and 1.8% by mass or less of Fe, more than 0.10% by mass and 0.20% by mass or less of Si, and 0.005% by mass or more and 0.05% by mass or less of Cu, and Mn regulated to be 0.01% by mass or less, with the balance consisting of Al and other incidental impurities, wherein,
with regard to crystal grains surrounded by high inclination angle grain boundaries which are grain boundaries having a misorientation of 15° or more in analysis of crystal orientation per unit area using electron backscatter diffraction, an average grain size of the crystal grains is 10 μm or less, and a maximum grain size of the crystal grains/the average grain size of the crystal grains≤3.0, and when a thickness of the foil is 30 μm, elongations in directions making 0°, 45° and 90° with respect to a rolling direction are each 25% or more respectively.

The aluminum alloy foil according to a second aspect of the present invention is characterized in that, in the aluminum alloy foil according to the first aspect of the present invention, as a texture, the Cu orientation density is 40 or less, and the R orientation density is 30 or less.

A method for producing the aluminum alloy foil is characterized in that, in the method for producing the aluminum alloy foil according to the first or second aspect of the present invention, an ingot of an aluminum alloy having a composition according to the first aspect of the present invention is subjected to homogenization treatment involving holding the ingot at 460° C. to 550° C. for 6 hours or more, and after the homogenization treatment, is subjected to hot rolling such that the rolling finishing temperature becomes 230° C. or more and less than 300° C., and in the course of cold rolling, is subjected to intermediate annealing at 300° C. to 400° C., to achieve a cold rolling rate of 30% or more and 70% or less obtained from the start of the cold rolling to the intermediate annealing, and a final cold rolling rate of 97% or more obtained from the completion of the intermediate annealing to a time point at which a final thickness is achieved.

The matters defined by the present invention will be described below.

Fe: 1.0% by mass or more and 1.8% by mass or less

Fe crystallizes out as an Al—Fe based intermetallic compound in casting, and when the size of the compound is large, becomes a recrystallization site in annealing, and therefore, has an effect of refining the recrystallized grains. When the content of Fe is less than the lower limit, the distribution density of the coarse intermetallic compounds decreases, the refining effect is weak, and the final grain size distribution also becomes non-uniform. When the content of Fe is greater than the upper limit, the grain refining effect is saturated or even reduced, and in addition, the size an Al—Fe based compound to be produced in casting becomes very large, and the elongation and the rolling ability of the foil decrease. Therefore, the content of Fe is regulated in the above range.

Due to a reason analogous to as described above, it is preferable that the lower limit of the content of Fe is set to 1.3% by mass, and the upper limit of the content of Fe is set to 1.6% by mass.

Si: More than 0.10% by mass and 0.20% by mass or less

Si together with Fe forms an intermetallic compound; however, when Si is added in an excessive amount, this results in coarsening of the size of the compound and decrease of the distribution density. When the content of Si is greater than the upper limit, there is a concern that the rolling ability and elongation properties decrease due to the coarse crystallized products, and in addition, uniformity of recrystallized grain size distribution after the final annealing decreases. In addition, Si has an effect of promoting the precipitation of Fe, and therefore, when Si is excessively reduced, the amount of Fe to be solid-soluted increases, thus recrystallization in annealing is strongly suppressed, to generate in situ recrystallization to a large extent. When in situ recrystallization occurs in the final annealing, this causes increase in the Cu orientation density and the R orientation density. Due to the reasons described above, the content of Si is regulated to be more than 0.10% by mass to 0.20% by mass.

Cu: 0.005% by mass or more and 0.05% by mass or less

Cu is an element that increases the strength of the aluminum foil, and decreases the elongation of the aluminum foil. By contrast to this, Cu has an effect of suppressing excessive work softening during cold rolling. When the content of Cu is less than 0.005% by mass, the effect of suppressing work softening is weak, and when the content of Cu is more than 0.05% by mass, the elongation clearly decreases. Therefore, the content of Cu is regulated in the above range.

Due to a reason analogous to as described above, the lower limit of the content of Cu is preferably set to 0.008% by mass, and the upper limit of the content of Cu is preferably set to 0.012% by mass.

Mn: 0.01% by mass or less

Mn serves in such a way that Mn solid-solutes in an aluminum matrix, or/and form a very fine compound to suppress the recrystallization of aluminum. When Mn is in a trace amount, suppression of work softening can be expected in a manner analogous to as in that of Cu; however, when the additive amount of Mn is large, intermediate annealing and recrystallization in the final annealing delay, and it is difficult to obtain homogenous fine crystal grains, and in addition, the Cu orientation density and the R orientation density increase. Therefore, the content of Mn is regulated to be 0.01% by mass or less.

Due to a reason analogous to as described above, the upper limit of the content of Mn is more preferably set to 0.005% by mass. When the suppression of work softening is positively expected, adding Mn of 0.002% by mass or more is desirable.

With regard to crystal grains surrounded by high inclination angle grain boundary having a misorientation of 15° or more, an average grain size of the crystal grains is 10 μm or less, and a maximum grain size of the crystal grains/the average grain size of the crystal grains ≤3.0

As a result of the fact that the crystal grains become finer, the flexible aluminum foil can suppress surface deteriorations on a surface of the deformed foil, and high elongation and high formability associated with high elongation can be expected to be achieved. Influence of this grain size become larger as the thickness of the foil is thinner. For the purpose of achieving high elongation properties and high formability associated with high elongation properties, it is desirable that, with regard to crystal grains surrounded by high inclination angle grain boundaries having a misorientation of 150 or more, an average grain size of the crystal grains is 10 μm or less. In this regard, in the case where the average grain sizes of the crystal grains are same as one another and the grain size distribution of the crystal grains is nonuniform, localized deformation tends to occur, and the elongation decreases. Therefore, high elongation properties can be achieved not only by setting the average grain size to 10 μm or less, but also by setting the maximum grain size/the average grain size to ≤3.0.

The average grain size is preferably 8 μm or less, and the ratio is preferably 2.5 or less.

Based on analysis of crystal orientation per unit area using electron backscatter diffraction (EBSD: Electron Backscatter Diffraction), it is possible to obtain a map of high inclination angle grain boundaries having a misorientation of 15° or more.

When the thickness of the foil is 30 μm, elongations in directions making 0°, 45° and 90° with respect to a rolling direction are 25% or more respectively The elongation of the foil is important for high formability, and in particular, it is important that, when a direction parallel to a rolling direction is defined as 0°, the elongation in each of directions making 0°, 45°, 90° which is a direction normal to the rolling direction, is high. The value of the elongation of the foil is highly influenced by the thickness of the foil; however, high formability can be expected to be achieved as long as the thickness of the foil is 30 μm and the elongation is 25% or more.

as a texture, the Cu orientation density is 40 or less, and the R orientation density is 30 or less A texture has a large influence on the elongation of the foil. When the Cu orientation density is more than 40 and R orientation density is more than 30, elongation values at 0°, 45° and 90° undergo anisotropy, and in particular, elongation values in directions of 0° and 90° decrease. When the elongation undergoes anisotropy, homogenous deformation cannot be achieved in formation, and the formability decreases. Therefore, the balance among the elongations in three directions can be retained by maintaining the Cu orientation density to be 40 or less and maintaining the R orientation density to be 30 or less. It is more preferable that the Cu orientation density is 30 or less and the R orientation density is 20 or less.

Homogenization treatment: holding at 460° C. to 550° C. for 6 hours or more

The homogenization treatment here is intended to eliminate microsegregation in the ingot, and adjust distribution state of the intermetallic compounds, and is very important treatment for eventually obtaining a homogenous fine grain structure. In the homogenization treatment, a temperature less than 460° C. is undesirable because such a temperature requires a very long period of time for eliminating microsegregation in the ingot. In addition, at a temperature of more than 550° C., a crystallized product grows, and the density of coarse intermetallic compounds having a grain size of 1 μm or more and less than 3 μm, which will be a nucleation site in recrystallization, decreases, and as a result of this, the grain size tends to be coarse. For the purpose of obtaining a desired texture intended in intermediate annealing or the final annealing, it is necessary to precipitate Fe precipitation as much as possible. At a high temperature of more than 550° C., the recurrence of solid soluting of Fe occurs to a slight extent, and therefore, a temperature of 550° C. or less is desirable for the purpose of reducing the solid soluting amount of Fe. The time required for the homogenization treatment varies depending on temperatures; however, with regard to any of these temperatures, there is a need for ensuring the homogenization treatment for at least 6 hours or more. With regard to the homogenization treatment less than 6 hours, there is concern that this the homogenization treatment results in insufficient elimination of microsegregation, and insufficient precipitation of Fe.

Rolling finishing temperature of hot rolling: 230° C. or more and less than 300° C.

After the homogenization treatment, hot rolling is performed. In the hot rolling, it is desirable that a hot rolling finishing temperature is set to less than 300° C. to suppress recrystallization. By setting the hot rolling finishing temperature to less than 300° C., the hot-rolled sheet becomes a homogenous fibrous structure. As a result of suppressing recrystallization after hot rolling in this way, the amount of strain accumulated until the achievement of a sheet thickness in intermediate annealing at a later time point increases, and it is possible to obtain a fine structure of the recrystallized grain in intermediate annealing. This is associated with the fineness of the final crystal grain. At a temperature of more than 300° C., recrystallization occurs at a portion of the hot-rolled sheet, the fibrous structure and the recrystallized grain structure will present in a mixed manner, and as a result of this, recrystallization grain size in the intermediate annealing is non-uniform, and this directly leads to nonuniformity of the final grain size. For the purpose of finishing the hot rolling at less than 230° C., the temperature during hot rolling is also extremely low, and therefore, there is a concern that cracks generates on the side of the sheet and the productivity greatly decreases.

Intermediate annealing: 300° C. to 400° C.

Intermediate annealing softens the material cured by repeating cold rolling to restore rolling ability, and in addition, promotes the precipitation of Fe to reduce the amount of solid-soluted Fe. At less than 300° C., there is a risk that the recrystallization is not completed to result in a non-uniform grain structure. Also, at a high temperature of more than 400° C., the coarsening of the recrystallized grains occurs to result in larger final grain size. At a higher temperature, the amount of the precipitation of Fe decreases, and the amount of solid-soluted Fe becomes larger. When the amount of solid-soluted Fe is large, recrystallization in the final annealing is suppressed, and as a result of this, the Cu orientation and R orientation densities greatly increase.

A cold rolling rate of 30% or more and 70% or less obtained from the start of the cold rolling to the intermediate annealing, and a final cold rolling rate of 97% or more obtained from the completion of the intermediate annealing to a time point at which the final thickness is achieved Recrystallization behavior of Al—Fe alloy is highly influenced by the cold rolling rate obtained before heat treatment, in addition to the solid soluted state of Fe described in the section regarding the above intermediate annealing. As the rolling rate becomes higher, recrystallized grains after annealing becomes finer, but the Cu orientation and the R orientation tend to grow. The development of Cu orientation and R orientation after the final annealing can be suppressed by performing cold rolling subsequent to the hot rolling, and performing intermediate annealing with the thickness of the sheet obtained on the course for achieving the final thickness. However, when the cold rolling rate obtained from the start of the cold rolling to the intermediate annealing is less than 30%, even with regard to a material obtained by setting a hot rolling finishing temperature to a low temperature, there is a concern that the material has a structure in which the amount of strain is small, the recrystallization is incomplete or the crystal grain size is non-uniform. By contrast to this, when this cold rolling rate is more than 70%, it is not possible to obtain a desired Cu orientation density and a desired R orientation density after the final annealing.

Even when the cold rolling rate obtained until the intermediate annealing is more than 70%, it is possible to suppress the development of Cu orientation and R orientation after the final annealing by setting the final cold rolling rate to 93% or less. However, when the final cold rolling rate is less than 97%, the recrystallized grain size after the final annealing becomes coarse, and a fine structure having an average grain size of 5 μm or less cannot be obtained, and high ductility, and hence, high formability cannot be achieved.

Advantageous Effect of Invention

According to the present invention, it is possible to obtain an aluminum alloy foil having high elongation properties.

BRIEF DESCRIPTION OF DRAWING

FIG. 1 shows the plane shape of a square type punch for use in an ultimate forming height test in Examples according to the present invention.

DESCRIPTION OF EMBODIMENTS

A method for producing an aluminum alloy foil according to one embodiment of the present invention will be described.

As an aluminum alloy, an aluminum alloy ingot was produced in such a way that the aluminum alloy ingot is produced to have a composition containing 1.0% by mass or more and 1.8% by mass or less of Fe, more than 0.10% by mass and 0.20% by mass or less of Si, 0.005% by mass or more and 0.05% by mass or less of Cu, and containing Mn regulated to be 0.01% by mass or less, with the balance consisting of Al and other incidental impurities. The method for producing an ingot is not limited in particular, and can be performed by a conventional method such as semi-continuous casting. The resulting ingot is subjected to homogenization treatment involving holding the ingot at 460° C. to 550° C. for 6 hours or more.

After homogenization treatment, hot rolling is performed, and a rolling finishing temperature is set to 230° C. or more and less than 300° C. Subsequently, cold rolling is performed, and intermediate annealing is performed in the course of the cold rolling. In the intermediate annealing, the temperature is set to 300° C. to 400° C. The time for intermediate annealing is preferably 3 hours or more and less than 10 hours. In the case where the time for intermediate annealing is less than 3 hours, when the annealing temperature is low temperature, softening of the material is likely to be insufficient, and annealing for a prolonged time of 10 hours or more is not preferable in an economical viewpoint.

The cold rolling rate obtained from the start of the cold rolling to the intermediate annealing is 30% or more and 70% or less.

Cold rolling after intermediate annealing corresponds to the final cold rolling, and the final cold rolling rate in this cold rolling is set to 97% or more. The thickness of the foil is not limited in particular, and can be, for example, 10 µm to 40 µm.

The resulting aluminum alloy foil has excellent elongation properties, and when the thickness of this aluminum alloy foil is, for example, 30 µm, the elongation in each of directions making 0°, 45° and 90° with respect to a rolling direction is 25% or more.

In addition, the aluminum foil preferably has a Cu orientation density of 40 or less, and an R orientation density of 30 or less. As a result of satisfying these definitions, the balance among elongations in three directions can be retained in a better manner.

In the aluminum alloy foil, the density of the intermetallic compound is desirably satisfies the following definition.

The density of an Al—Fe based intermetallic compound having a grain size of 1 µm or more and less than 3 µm: $1 \times 10^4/mm^2$ or more The grain size of 1 µm or more is generally said to be a grain size by which the intermetallic compound will be a nucleation site in recrystallization, and as a result of the distribution of such intermetallic compounds in a highly dense manner, it tends to obtain recrystallized fine grains in the annealing. When the grain size is less than 1 µm, or the density is less than $1 \times 10^4/mm^2$, the intermetallic compound tends not to serve as a nucleation site in recrystallization, and a grain size of more than 3 µm tends to result in pin holes in the rolling, and decrease in the elongation. Therefore, the density of an Al—Fe based intermetallic compound having a grain size of 1 µm or more and less than 3 µm is desirably in the above range.

The density of an Al—Fe based intermetallic compound having a grain size of 0.1 µm or more and less than 1 µm: $2 \times 10^5/mm^2$ or more In general, it is said that the above-described size tends not to result in a nucleation site in recrystallization; however, the results are obtained, in which it is believed that grain refining and recrystallization behavior is highly influenced by the above-described size. An overall picture of this mechanism has not become apparent; however, as a result of the coarse intermetallic compounds having a grain size of 1 to 3 µm, and in addition, as a result of the fact that the fine compounds less than 1 µm are present in a highly dense manner, it has been confirmed that the recrystallized grains after the final annealing are refined, and decrease in the length of HAGBs/the length of LAGBs is suppressed. This is likely to promote grain division (Grain subdivision mechanism) in cold rolling. Therefore, it is desirable that the density of the Al—Fe based intermetallic compound having a grain size of 0.1 µm or more and less than 1 µm is in the above range.

The resulting aluminum alloy foil can be deformed by press forming and the like, and can be conveniently used as, for example, a packaging material for food and lithium ion batteries. Applications of the aluminum alloy foil of the present invention are not limited to those described above, and the aluminum alloy foil of the present invention can be used for suitable applications.

Example 1

Ingots of an aluminum alloy having a composition shown in Table 1 were produced by semi-continuous casting method. Subsequently, under production conditions shown in Table 1 (the conditions of homogenization treatment, the finishing temperatures of hot rolling, the sheet thickness in intermediate annealing, the condition of intermediate annealing and the final cold rolling rates), the resulting ingots were subjected to homogenization treatment, hot-rolled, cold-rolled, subjected to intermediate annealing, and again cold rolled, to produce aluminum alloy foils.

The thickness of the foils was 30 µm.

The resulting aluminum alloy foil was subjected to the measurement and evaluation described below.

Tensile Strength and Elongation

Both of the tensile strength and the elongation were determined by a tensile test. The tensile test was in accordance with JIS Z 2241, and a test piece of JIS No. 5 was obtained from the sample in such a way that elongation in each of directions making 0°, 45° and 90° with respect to a rolling direction can be measured, and the test piece was tested at a stretching speed of 2 mm/min by using a universal tensile testing machine (AGS-X 10 kN manufactured by Shimadzu Corporation). The calculation of the elongation rate is as follows. First of all, before the test, two lines are made as markings at the center of the test piece in a longitudinal direction in a direction perpendicular to the test piece with an interval of 50 mm, which is a gauge distance. After the test, the fracture surfaces of the aluminum alloy foil were opposed against one another to determine a distance between the markings, and the amount of elongation (mm) obtained by subtracting the gauge distance (50 mm) from the distance between the markings was divided by the distance between gauge marks (50 mm) to determine the elongation rate (%).

The measurement results of elongation (%) and tensile strength (MPa) at each of the directions are shown in Table 2.

Grain Size

After subjecting a surface of the foil to electrolytic polishing, crystal orientation analysis was performed by SEM (Scanning Electron Microscope)-EBSD, and grain boundaries having a misorientation between the crystal grains of 15° or more was defined as HAGBs (high inclination angle grain boundary) to determine the size of the crystal grains surrounded by HAGBs. Three fields of view were measured at a magnification factor of ×1000 by using the size of field of view of 45×90 μm to calculate the average grain size, and the maximum grain size/the average grain size. The individual grain size was calculated by using the equivalent circle diameter, and an Area method (Average by Area Fraction Method) of EBSD was used to calculate the average grain size. OIM Analysis manufactured by TSL Solutions company was used for this analysis.

Crystal Orientation

The Cu orientation had a representative orientation of {112}<111>, and the R orientation had a representative orientation of {123} <634>. The orientation densities thereof were evaluated by determining incomplete pole figures of {111}, {200} and {220} by X-ray diffraction, and using the results to calculate and evaluate the three-dimensional orientation distribution function (ODF). The results are shown in Table 2.

Ultimate Forming Height

The forming height was evaluated by a square-tube forming test. The test was performed by using a universal thin sheet forming testing machine (model 142/20 manufactured by ERICHSEN company), and an aluminum foil having a thickness of 30 μm was employed for this test by using a square type punch (the length L of one side=37 mm, and the chamfering diameter R of a corner=4.5 mm) having a shape shown in FIG. 1. With regard to the test conditions, wrinkle restraining force was set to 10 kN, and the scale of the moving-up speed of punch (forming rate) was set to 1, and subsequently, a mineral oil was applied onto one face of the foil (a face to be in contact with the punch) as a lubricant. The foil was formed by contacting a punch moving up from the lower part of the apparatus to the foil, and at this time, the maximum height to which the punch has moved up in the case where the forming could be accomplished without cracking and pin holes in continuous forming of three times was defined as the ultimate forming height (mm) of the material of interest. The height of the punch was changed with intervals of 0.5 mm.

The Density of the Intermetallic Compound

With regard to the intermetallic compound, a parallel section (RD-ND plane) of the foil was cut by using a CP (Cross section polisher) and was observed by using a field-emission scanning electron microscope (FE-SEM: NVision40 manufactured by Carl Zeiss company). With regard to the "Al—Fe based intermetallic compounds having a grain size of 1 μm or more and less than 3 μm", five fields of view observed at a magnification factor×2000 were subjected to image analysis to calculate the density of the intermetallic compounds having such a grain size. The calculation results are shown in Table 2.

TABLE 1

| | | | | | | | Production conditions | | |
|---|---|---|---|---|---|---|---|---|---|
| | | | | | | | Homogenization treatment | | Hot rolling finishing |
| | | Chemical component (mass %) | | | | | Temperature | Time | temperature |
| | No. | Si | Fe | Cu | Mn | | (° C.) | (h) | (° C.) |
| Examples | 1 | 0.15 | 1.4 | 0.01 | 0.005 | | 510 | 8 | 265 |
| | 2 | 0.12 | 1.6 | 0.01 | 0.006 | | 510 | 8 | 270 |
| | 3 | 0.18 | 1.5 | 0.009 | 0.004 | | 510 | 8 | 269 |
| | 4 | 0.13 | 1.1 | 0.014 | 0.005 | | 480 | 10 | 241 |
| | 5 | 0.15 | 1.7 | 0.01 | 0.005 | | 510 | 6 | 287 |
| | 6 | 0.14 | 1.4 | 0.006 | 0.007 | | 510 | 10 | 264 |
| | 7 | 0.14 | 1.5 | 0.04 | 0.001 | | 480 | 8 | 288 |
| | 8 | 0.15 | 1.4 | 0.01 | 0.005 | | 460 | 6 | 273 |
| | 9 | 0.15 | 1.4 | 0.01 | 0.006 | | 530 | 8 | 290 |
| Comparative Examples | 10 | 0.23 | 1.4 | 0.01 | 0.005 | | 510 | 8 | 249 |
| | 11 | 0.14 | 0.8 | 0.008 | 0.004 | | 510 | 10 | 238 |
| | 12 | 0.13 | 2.1 | 0.008 | 0.005 | | 510 | 8 | 280 |
| | 13 | 0.16 | 1.4 | 0.002 | 0.004 | | 480 | 10 | 257 |
| | 14 | 0.14 | 1.5 | 0.07 | 0.006 | | 510 | 8 | 247 |
| | 15 | 0.14 | 1.4 | 0.013 | 0.03 | | 480 | 8 | 271 |
| | 16 | 0.15 | 1.4 | 0.01 | 0.005 | | 430 | 3 | 220 |
| | 17 | 0.15 | 1.4 | 0.01 | 0.005 | | 580 | 8 | 294 |
| | 18 | 0.12 | 1.6 | 0.01 | 0.006 | | 480 | 8 | 330 |
| | 19 | 0.04 | 1.4 | 0.01 | 0.005 | | 510 | 8 | 245 |
| | 20 | 0.18 | 1.5 | 0.009 | 0.004 | | 510 | 8 | 270 |
| | 21 | 0.15 | 1.4 | 0.01 | 0.005 | | 480 | 10 | 248 |
| | 22 | 0.15 | 1.4 | 0.01 | 0.005 | | 510 | 6 | 289 |

| | | Production conditions | | | | Final cold |
|---|---|---|---|---|---|---|
| | | Intermediate annealing | | | | |
| | | Sheet thickness | cold roiling reduction | Temperature | Time | rolling reduction rate |
| | No. | (mm) | rate (%) | (° C.) | (h) | (%) |
| Examples | 1 | 2.5 | 44.4 | 330 | 4 | 98.8 |
| | 2 | 2.5 | 44.4 | 330 | 4 | 98.8 |
| | 3 | 2.5 | 44.4 | 360 | 4 | 98.8 |
| | 4 | 2.5 | 44.4 | 360 | 4 | 98.8 |
| | 5 | 2.5 | 44.4 | 360 | 4 | 98.8 |
| | 6 | 2.5 | 44.4 | 360 | 3 | 98.8 |

TABLE 1-continued

|  | No. | | | | | |
|---|---|---|---|---|---|---|
|  | 7 | 2.5 | 44.4 | 330 | 4 | 98.8 |
|  | 8 | 2.5 | 44.4 | 360 | 4 | 98.8 |
|  | 9 | 1.5 | 66.7 | 400 | 4 | 98.0 |
| Comparative | 10 | 2.5 | 44.4 | 360 | 4 | 98.8 |
| Examples | 11 | 2.5 | 44.4 | 360 | 4 | 98.8 |
|  | 12 | 2.5 | 44.4 | 330 | 4 | 98.8 |
|  | 13 | 2.5 | 44.4 | 330 | 4 | 98.8 |
|  | 14 | 2.5 | 44.4 | 360 | 4 | 98.8 |
|  | 15 | 2.5 | 44.4 | 360 | 4 | 98.8 |
|  | 16 | 2.5 | 44.4 | 400 | 4 | 98.8 |
|  | 17 | 2.5 | 44.4 | 360 | 4 | 98.8 |
|  | 18 | 2.5 | 44.4 | 330 | 4 | 98.8 |
|  | 19 | 2.5 | 44.4 | 250 | 3 | 98.8 |
|  | 20 | 2.5 | 44.4 | 450 | 3 | 98.8 |
|  | 21 | 0.5 | 88.9 | 330 | 3 | 94.0 |
|  | 22 | None | — | — | — | 99.3 |

TABLE 2

| | No. | Crystallized grain structure | | Texture | | Intermetallic compound |
|---|---|---|---|---|---|---|
| | | Average grain size (μm) | Grain size ratio | Cu orientation | R orientation | 1.0~3.0 μm (×10$^4$/mm$^2$) |
| Examples | 1 | 9.1 | 2.2 | 25.5 | 14.9 | 1.6 |
| | 2 | 8.5 | 2.2 | 27.6 | 15.8 | 1.9 |
| | 3 | 9.5 | 2.7 | 26.7 | 15.6 | 1.5 |
| | 4 | 9.8 | 2.8 | 18.1 | 9.7 | 1.1 |
| | 5 | 8.9 | 2.3 | 32.2 | 24.0 | 1.9 |
| | 6 | 9.8 | 2.8 | 33.5 | 22.2 | 1.6 |
| | 7 | 8.5 | 2.1 | 26.9 | 17.8 | 1.7 |
| | 8 | 9.4 | 2.9 | 30.8 | 20.5 | 1.4 |
| | 9 | 9.1 | 2.6 | 36.5 | 21.5 | 1.9 |
| Comparative | 10 | 11.2 | 2.7 | 27.9 | 18.5 | 1.5 |
| Examples | 11 | 12.1 | 3.5 | 16.0 | 9.3 | 0.8 |
| | 12 | 9.6 | 2.7 | 35.4 | 22.2 | 2.2 |
| | 13 | 17.0 | 6.1 | 41.1 | 23.1 | 1.7 |
| | 14 | 9.2 | 2.5 | 38.9 | 2.4 | 1.8 |
| | 15 | 8.3 | 2.8 | 44.8 | 29.0 | 1.5 |
| | 16 | 9.5 | 3.4 | 35.2 | 25.6 | 1.3 |
| | 17 | 11.5 | 3.4 | 35.6 | 25.0 | 1.5 |
| | 18 | 11.9 | 4.1 | 27.9 | 15.6 | 1.7 |
| | 19 | 10.0 | 4.0 | 70.7 | 29.9 | 1.6 |
| | 20 | 10.9 | 2.6 | 30.4 | 19.7 | 1.6 |
| | 21 | 11.4 | 2.7 | 61.7 | 31.5 | 1.7 |
| | 22 | 8.1 | 2.5 | 74.8 | 32.4 | 1.7 |

| | No. | Mechanical properties | | | | | | Ultimate bulging height (mm) |
|---|---|---|---|---|---|---|---|---|
| | | Elongation (%) | | | Tensile strength (MPa) | | | |
| | | 0° | 45° | 90° | 0° | 45° | 90° | |
| Examples | 1 | 27.5 | 30.7 | 26.5 | 103 | 97 | 100 | 10.0 |
| | 2 | 27.9 | 30.5 | 27.3 | 105 | 99 | 102 | 10.5 |
| | 3 | 26.7 | 29.9 | 26.3 | 101 | 94 | 97 | 9.5 |
| | 4 | 25.5 | 27.8 | 25.3 | 98 | 94 | 96 | 9.5 |
| | 5 | 27.3 | 31.3 | 26.4 | 103 | 95 | 99 | 9.5 |
| | 6 | 26.3 | 31.1 | 25.2 | 97 | 89 | 94 | 9.5 |
| | 7 | 27.0 | 30.5 | 26.4 | 107 | 99 | 103 | 9.5 |
| | 8 | 25.3 | 28.7 | 24.5 | 107 | 97 | 102 | 9.5 |
| | 9 | 27.0 | 31.1 | 26.4 | 102 | 95 | 98 | 9.5 |
| Comparative | 10 | 24.1 | 28.6 | 23.5 | 90 | 84 | 87 | 8.5 |
| Examples | 11 | 23.6 | 25.7 | 23.0 | 82 | 79 | 80 | 8.0 |
| | 12 | 23.8 | 28.0 | 22.7 | 105 | 96 | 101 | 8.5 |
| | 13 | 18.3 | 25.1 | 17.6 | 86 | 77 | 82 | 7.5 |
| | 14 | 24.0 | 28.2 | 23.4 | 116 | 108 | 114 | 8.5 |
| | 15 | 23.3 | 28.9 | 22.8 | 111 | 102 | 106 | 7.5 |
| | 16 | 24.1 | 28.9 | 23.4 | 110 | 99 | 106 | 8.0 |
| | 17 | 23.7 | 28.3 | 23.3 | 101 | 93 | 99 | 9.0 |
| | 18 | 22.1 | 26.2 | 21.8 | 90 | 83 | 87 | 7.5 |
| | 19 | 22.0 | 28.6 | 21.1 | 102 | 89 | 95 | 7.0 |

TABLE 2-continued

| | | | | | | | |
|---|---|---|---|---|---|---|---|
| 20 | 22.9 | 27.7 | 22.4 | 95 | 88 | 91 | 8.0 |
| 21 | 21.1 | 26.6 | 20.5 | 88 | 76 | 82 | 7.0 |
| 22 | 20.3 | 26.8 | 19.5 | 120 | 99 | 111 | 6.5 |

As shown in Table 2, in Examples 1 to 9 that satisfy the definitions according to the present invention, good results has been achieved with regard to the elongation, the tensile strength and ultimate bulging height, and by contrast to this, good results have not been achieved in Comparative Examples 10 to 22 that do not satisfy one or more of the definitions according to the present invention.

The invention claimed is:

1. An aluminum alloy foil having a composition containing 1.0% by mass or more and 1.8% by mass or less of Fe, more than 0.10% by mass and 0.20% by mass or less of Si, 0.005% by mass or more and 0.05% by mass or less of Cu, Mn regulated to be 0.01% by mass or less, and the balance Al and incidental impurities, wherein, with regard to crystal grains surrounded by high inclination angle grain boundaries which are grain boundaries having a misorientation of 15° or more in analysis of crystal orientation per unit area using electron backscatter diffraction, an average grain size of the crystal grains is 10 μm or less, and a maximum grain size of the crystal grains/the average grain size of the crystal grains ≤3.0, and when a thickness of the foil is 30 μm, elongations in directions making 0°, 45° and 90° with respect to a rolling direction are each 25% or more respectively.

2. The aluminum alloy foil according to claim 1, wherein, as a texture, a Cu orientation density is 40 or less, and an R orientation density is 30 or less.

3. A method for producing the aluminum alloy foil according to claim 1, comprising:

subjecting an ingot of an aluminum alloy having said composition to homogenization treatment comprising holding the ingot at 460° C. to 550° C. for 6 hours or more, after the homogenization treatment, subjecting the ingot to hot rolling such that a rolling finishing temperature becomes 230° C. or more and less than 300° C., and during cold rolling, performing intermediate annealing at 300° C. to 400° C., to achieve a cold rolling rate of 30% or more and 70% or less obtained from the start of the cold rolling to the intermediate annealing, and a final cold rolling rate of 97% or more obtained from the completion of the intermediate annealing to a time point at which a final thickness is achieved.

4. A method for producing the aluminum alloy foil according to claim 2, comprising:

subjecting an ingot of an aluminum alloy having said composition to homogenization treatment comprising holding the ingot at 460° C. to 550° C. for 6 hours or more, after the homogenization treatment, subjecting the ingot to hot rolling such that a rolling finishing temperature becomes 230° C. or more and less than 300° C., and during cold rolling, performing intermediate annealing at 300° C. to 400° C., to achieve a cold rolling rate of 30% or more and 70% or less obtained from the start of the cold rolling to the intermediate annealing, and a final cold rolling rate of 97% or more obtained from the completion of the intermediate annealing to a time point at which a final thickness is achieved.

* * * * *